United States Patent [19]

Portinari

[11] Patent Number: 4,673,540

[45] Date of Patent: Jun. 16, 1987

[54] PROCESS AND APPARATUS FOR MANUFACTURING A CORE PROVIDED WITH OPEN HELICAL GROOVES FOR RECEIVING OPTICAL FIBERS

[75] Inventor: Antonio Portinari, Sesto San Giovanni, Italy

[73] Assignee: Societa' Cavi Pirelli S.p.A., Milan, Italy

[21] Appl. No.: 808,442

[22] Filed: Dec. 12, 1985

[30] Foreign Application Priority Data

Dec. 17, 1984 [IT] Italy .............................. 24090 A/84

[51] Int. Cl.$^4$ ......................... B29C 47/02; G02B 5/16
[52] U.S. Cl. .................................... 264/1.5; 264/103; 264/174; 425/111; 425/113; 425/321; 425/376 B
[58] Field of Search ...................... 264/103, 174, 1.5; 425/113, 114, 319–322, 111, 112, 376 B

[56] References Cited

U.S. PATENT DOCUMENTS

| | | | |
|---|---|---|---|
| 2,731,069 | 1/1956 | Horn | 264/103 |
| 2,778,059 | 1/1957 | Henning et al. | 264/103 |
| 4,117,064 | 9/1978 | Mathe et al. | 264/103 |
| 4,155,963 | 5/1979 | de Vecchis et al. | 264/1.5 |
| 4,182,738 | 1/1980 | Casaert et al. | 264/281 |
| 4,205,899 | 6/1980 | King et al. | 264/1.5 |
| 4,474,426 | 10/1984 | Yataki | 264/1.5 |
| 4,528,148 | 7/1985 | Dotti | 264/1.5 |
| 4,548,567 | 10/1985 | Missout | 425/113 |

FOREIGN PATENT DOCUMENTS

| | | | |
|---|---|---|---|
| 0123288 | 10/1984 | European Pat. Off. | 264/1.5 |
| 46-17733 | 5/1971 | Japan | 264/174 |
| 59-192205 | 10/1984 | Japan | 264/1.5 |

*Primary Examiner*—Jeffery Thurlow
*Attorney, Agent, or Firm*—Brooks Haidt Haffner & Delahunty

[57] ABSTRACT

Process and apparatus for forming a core for optical fiber cables, the core having a central reinforcing element surrounded and contacted by a layer of plastic having helical grooves at its surface. The helical grooves are formed by passing the reinforcing element through a plastic extruder having a groove forming die and while the plastic is being applied at the extruder, the element is alternatley rotated in opposite directions in advance of its entry into the extruder. The reinforcing element may be rotated by a pair of driven belts which frictionally engage the element and which are mounted on rotatable rings driven by an alternating rotation motor drive or may be rotated by a pulley which frictionally engages the element and which is carried by a support rotatable around the longitudinal axis of the element by an alternating rotation motor drive.

8 Claims, 3 Drawing Figures

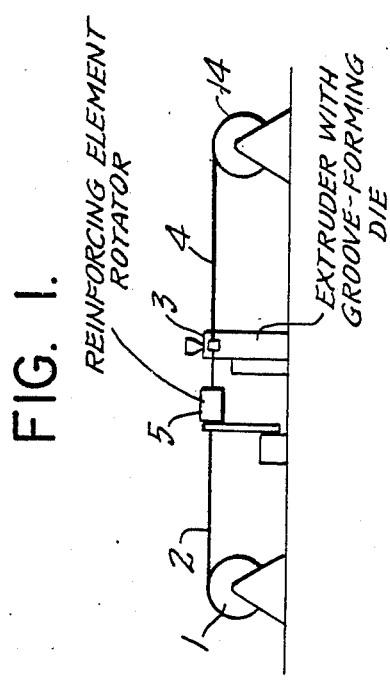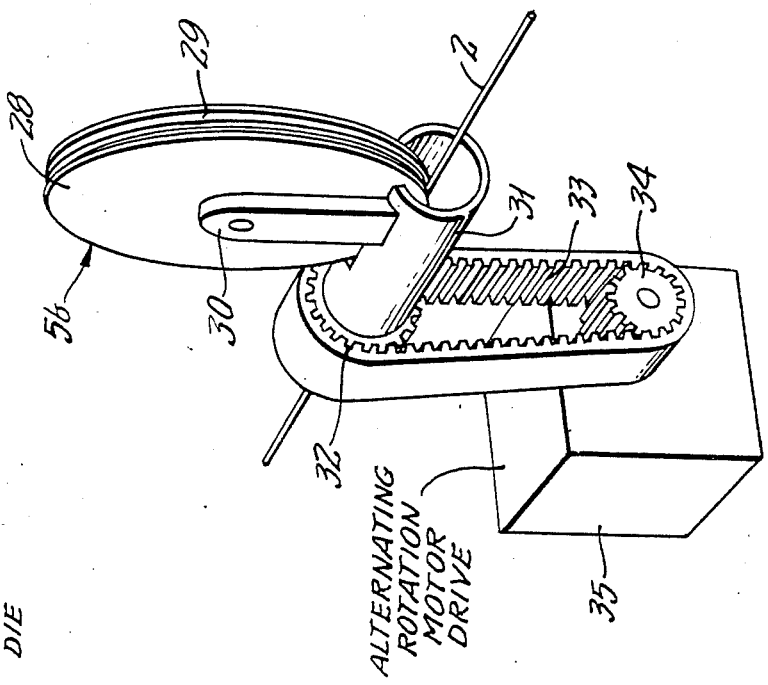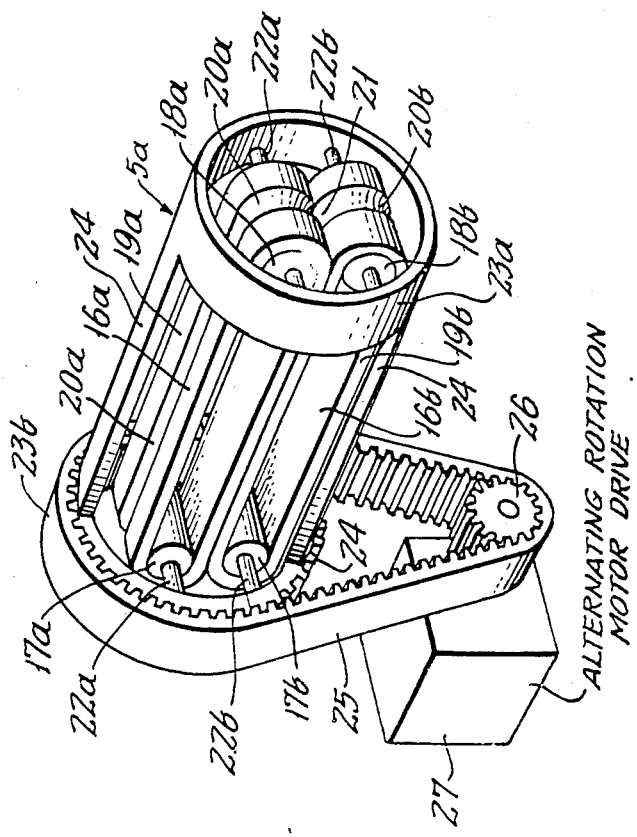

PROCESS AND APPARATUS FOR MANUFACTURING A CORE PROVIDED WITH OPEN HELICAL GROOVES FOR RECEIVING OPTICAL FIBERS

The present invention relates to a process and to improved apparatus for the manufacture of grooved cores which are adapted to receive optical fibers or components of telecommunication optical fiber cables.

More particularly, the present invention relates to a process, and to apparatus by which the process is put into effect, for providing a generally cylindrical core, made of plastic with a central reinforcing element and having at its surface helical grooves for receiving optical fibers.

In this text, by the term "open helical" grooves is meant grooves whose configuration is comprised by Z-and S-lengths, disposed in series, one with respect to the other. In other words, there is a length, e.g. a few turns, of a helical groove of right hand which is followed by a coextensive groove of a similar number of turns of left hand.

Elementary cables, or components of telecommunication optical fiber cables of the type in question, are already known per se.

These known elementary cables comprise a core, generally cylindrical, made of plastic and reinforced with a traction and compression resistant element, which has at its surface a plurality of open helical grooves of the above-defined type wherein the optical fibers are loosely received. Moreover, around the core there is present a covering comprised of either lapped tapes or an extruded sheath which, in covering the core, encloses the grooves thereby protecting the optical fibers which are received therein.

Processes and apparatus are already known for manufacturing the above-described optical fiber elementary cable. In the known processes and apparatus, the forming of the grooved core is carried out by one of the two methods described hereinafter.

In the first type of known process, the core is formed by extruding a plastic around a traction and compression resistant element, and after said plastic has hardened, the grooves are made by mechanically removing portions of the plastic where the grooves are desired.

In a second type of known process and production line for forming the grooved core, the core is made by extruding a plastic material around a traction and compression resistant element by means of a die formed so as to provide a cylindrical body having longitudinally extending rectilinear grooves at its surface. The helical form of the grooves is obtained during, and prior to, the solidification of the extruded core by imparting to the core an alternating rotating motion around its longitudinal axis. For this purpose, means which grip the core at a point where the plastic material has already been solidified and which imparts an alternating rotating motion to the core are provided. In this manner, the grooves, which are formed on the core at the time of its extrusion, assume an open helical configuration by reason of deformation of the unsolidified plastic material which is retained when the plastic solidifies.

The known processes and the apparatus for so manufacturing the grooved core have certain drawbacks.

In particular, the process and the apparatus with which the grooves are obtained on the core by machining, require the use of complex, and hence, extremely delicate, equipment which requires a very precise tuning, to obtain open helical grooves of a regular and uniform layout. Moreover, the core is subjected to substantial longitudinal stresses during the machining.

Insofar as the second type of processes and apparatus for manufacturing the open helix grooved core is concerned, the length of the production line for carrying out the process is considerable since it is necessary to interpose a long length of unsolidified plastic between the extruder and the mechanisms with which the oscillating rotary motion is imparted to the core to ensure that the plastic material, gripped by such mechanisms, has become perfectly solidified before it is gripped. Moreover, undesired shifting can take place in the layout of the open helical grooves due to the appreciable distance required between the point of extrusion and the point of application of the angular rotations on the core.

One object of the present invention is to overcome the above-stated drawbacks of the known processes and apparatus used for manufacturing grooved cores for optical fiber cables.

In accordance with the object of the present invention, the process for manufacturing a cylindrical plastic core which is reinforced by at least one longitudinal, traction and compression resistant element, said core being provided with at least one open helical groove at its outer surface for receiving one or more optical fibers, is characterized by the fact that said open helical grooves are formed by extruding plastic material around the said longitudinal resistant element with an extruder having a die which forms grooves in the plastic material and as the element enters the extruder, such element is subject to alternate torsion in advance of its entry into the extruder.

Another object of the present invention is to provide apparatus for manufacturing a grooved core for receiving one or more optical fibers in accordance with the above-described process, said apparatus being characterized by the fact of comprising an extruder head for extruding the plastic around the reinforcing element while forming grooves in the plastic and means, upstream of the extruder head, for imparting an alternating rotary motion to the reinforcing element of the core for thereby conferring a helical configuration to the grooves of the final core.

According to one embodiment, the means for imparting an alternating rotary motion to the reinforcing element of the core comprises a pulling device with a rectilineal element having continuous rectilinear elements such as a "caterpillar", mounting upon a frame subjected to an alternating rotary motion.

As an alternative, the means for imparting an alternating rotary motion to the reinforcing element of the core comprises a pulley around which the said reinforcing element is wound prior to its entry into the extruder, the pulley being mounted on a support which is subjected to an alternating rotary motion.

Other objects and advantages of the present invention will be apparent from the following detailed description of the presently preferred embodiments thereof, which description should be considered in conjunction with the accompanying drawings in which:

FIG. 1 is a schematic plan diagram which illustrates an apparatus for manufacturing the grooved cores according to the invention;

FIG. 2 is a perspective view of one means for imparting an alternating rotation to the resistant element of the core; and FIG. 3 shows a perspective view of an alternative embodiment of the means for imparting an alternating rotation to the resistant element of the core.

The fundamental step of the process, according to this invention, is that of shaping the grooves of the reinforced plastic core into an open helix by imparting an alternating rotary motion to the resistant element forming part of the core during the extrusion of the plastic material over the element.

In a specific embodiment of the process according to the present invention, an extruder is fed with a traction and compression resistant element while subjecting the element to an alternating rotary motion in advance of its entry into the extruder. The traction and compression resistant element is covered with plastic inside an extruder head having a known type of female mold or die provided with fixed protrusions for the formation of grooves. As the element advances and is rotated in one direction, a helical groove of one hand is formed in the plastic and as the element advances and is rotated in the opposite direction a groove of opposite hand is formed in the plastic.

The extruded plastic material on the element which issues from the extruder is cooled, and is still under the action of the alternating rotary torsional motion imparted to the traction and compression resistant element with the result that open helical grooves are provided at the surface of the core 1.

The production line illustrated in FIG. 1 comprises a bobbin 1 carrying a longitudinal, traction and compression resistant element 2 which may, for example, be a cord, a metallic wire, or a rod of a non-metallic material which is sufficiently rigid which element is known per se and is intended for the reinforcement of the plastic, cylindrical grooved core of an elementary cable containing optical fibers.

Downstream of the bobbin 1, there is an extruder head 3 through which the longitudinal, compression resistant element, cord, wire or rod 2 is covered with plastic so as to form a cylindrical grooved core 4.

Between the bobbin 1 and the extruder head 3, there is present means 5 for imparting to the longitudinal, compression resistant element 2, upon its advancing, an alternating rotary motion. The element 2 is selected to have torsion resistance such that rotation thereof by the means 5 causes rotation of at least the portion of the element 2 within the extruder head 3.

Particular embodiments of the rotating means 5, indicated schematically in FIG. 1, will be described in more detail hereinafter.

At the end of the production line, there is provided a bobbin 14 for collecting the grooved core 4 produced by means of said production line. The core 4, and hence the element 2, may be advanced by rotatably driving the bobbin 14 or by other conventional means.

In FIG. 2, there is illustrated one embodiment of the rotating means 5. As can be seen in FIG. 2, the means 5a comprises a pair of continuous drive elements 16a and 16b which are driven in synchronism by conventional means (not shown).

The continuous drive elements 16a and 16b may be belts 19a and 19b supported by pairs of pulleys 17a and 17b and 18a and 18b one pair of which is rotated by conventional drive means.

The belts 19a and 19b of the drive elements 16 are provided with grooves 20a and 20b on their surfaces so as to define a through cavity 21 inside which the longitudinal, traction and compression resistant element 2 (of the not-yet formed core 4) is disposed and gripped by the belts 19a and 19b.

The shafts 22a and 22b for the pulleys 17a 17b, 18a and 18b are supported on rotatable rings 23a and 23b which are connected together by bars 24 so as to define a rotatable frame which may be rotatably mounted on a conventional support (not shown) which permits rotation of the frame around the longitudinal axis of the latter, which axis coincides with the longitudinal axis of the element 2 which is gripped by the continuously driven belts 19a and 19b.

One of the rings, the ring 23b has teeth 24' at its periphery which interengage with the teeth of a toothed belt 25 which is driven by a gear 26 which is driven by a motor drive 27 which is adapted to rotate the gear 26 alternately in opposite directions.

FIG. 3 illustrates an alternative embodiment of the means 5 shown in FIG. 1 and which is used for imparting an alternating rotary motion to the longitudinal, traction and compression element 2.

As can be seen in FIG. 3, the means 5b comprises a pulley 28 provided with a groove 29 around which the longitudinal resistant element 2 travels during its advance.

The pulley 28 is mounted to freely rotate on a support 30 extending from a shaft 31 having teeth 32 engaging a toothed belt 33 driven by a gear 34. The gear 34 is mounted on the shaft of the motor drive 35 which is adapted to rotate the gear 34 alternately in opposite directions.

The reinforcing element 2 is drawn from the bobbin 1 and is sent to the extruder 3 through the means 5b which, with its alternating rotary motion, imparts to the element 2 an alternating rotary motion.

As described, the reinforcing element 2 is covered with plastic in the extruder 3 so as to form a layer of plastic on the element 2. Owing to the alternating rotary motion of the reinforcing element, the grooves that are formed on the surface of the core coming out of the extruder 3 have a helical, open configuration. The protrusions of the female mold or die in the extruder 3 have shaped profiles so as to provide grooves of the desired cross-section.

From the previously given description of the process and the apparatus according to the invention, it will be apparent that the objects of the invention can be achieved.

In fact, the formation of open helical grooves on a plastic core, effectuated by the means of an alternating rotation imparted to the resistant element of the core, permits achievement of a greater precision in the formation of the grooves because said alternating rotation can be effected in close proximity to the point of extrusion, i.e. any lagging or dephasing between the portion of the element 2 which is rotated and the portion of the element 2 in the extruder 3 during the alternating rotations can be substantially eliminated. In the known processes and production lines, where the alternating rotating motion is imparted by gripping the already formed and solidified core which is far removed from the extrusion point where the effect of the rotations take place, there can be a substantial lagging of the rotation of the plastic at the extruder with respect to the rotation of the solidified plastic.

Moreover, the fact that the formation of open helical grooves is achieved through rotations or twists imparted to the resistant element of the core permits shortening of the production line since extended lengths downstream of the extruder, to ensure sufficient solidification of the extruded plastic before it is gripped, is no longer necessary.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. A process for manufacturing a core for optical fiber cables, said core having an elongated traction, compression and torsion resistant reinforcing element surrounded and contacted by a layer of a plastic material, the layer having at least one open, helical groove at its outer surface for receiving at least one optical fiber, said process comprising:

advancing said element through an extruder and extruding said plastic material around said element as said element is so advanced, said extruder having groove forming means for forming at least one groove in the plastic material extruded around said element; and while said element is being advanced through said extruder, alternately rotating said element around its longitudinal axis in advance of and before the extrusion of the plastic material around said element by frictionally engaging the exterior surface of said element and alternately rotating said element around its longitudinal axis.

2. A process as set forth in claim 1 wherein said surface of said element is frictionally engaged prior to its entry into the extruder by alternately rotating means alternately rotated in opposite directions around the longitudinal axis of said element.

3. Apparatus for manufacturing a core for optical fiber cables, said core having an elongated traction, compression and torsion resistant reinforcing element surrounded and contacted by a layer of plastic material, the layer having at least one open, helical groove at its outer surface for receiving at least one optical fiber, said apparatus comprising:

an extruder for extruding said plastic material around said element, said extruder having an entrance side for receiving said element and an exit side from which the element with said plastic material therearound exits and said extruder having groove forming means therein for forming at least one groove in the plastic material extruded around said element;

advancing means for advancing said core and for advancing said element into the entrance side of and through said extruder; and rotatable means in advance of the entrance side of said extruder for frictionally engaging the exterior surface of said element before said plastic material is extruded therearound and alternately rotating said element in opposite directions around its longitudinal axis.

4. Apparatus as set forth in claim 4 wherein said rotatable means comprises a pair of opposed, rectilinearly movable elements for receiving and engaging said reinforcing element therebetween, rotatable mounting means supporting said rectilinearly movable elements for rotation around the longitudinal axis of said reinforcing element and drive means connected to said mounting means for alternately rotating said mounting means in opposite directions.

5. Apparatus as set forth in claim 4 wherein said rectilinearly movable elements are belts extending between pairs of rotatable rollers, said belts having grooves therein for receiving said reinforcing element, and wherein said mounting means comprises a frame encircling said rollers and said belts, said rollers being rotatably mounted on said frame.

6. Apparatus as set forth in claim 3 wherein said rotatable means comprises a rotatable pulley having a peripheral groove for receiving said reinforcing element, rotatable mounting means supporting said pulley for rotation around the longitudinal axis of said reinforcing element and in a direction transverse to the axis of said pulley and drive means connected to said mounting means for alternately rotating said mounting means in opposite directions.

7. Apparatus as set forth in claim 6 wherein said mounting means supports said pulley with its plane of rotation extending substantially parallel to the longitudinal axis of said reinforcing element.

8. Apparatus as set forth in claim 7 wherein said mounting means supports said pulley with its axis of rotation spaced from the longitudinal axis of said reinforcing element.

* * * * *